March 17, 1959

H. F. HORNER, JR 2,877,617

LAWN TRIMMER AND EDGER

Filed Nov. 16, 1955

INVENTOR
HERBERT F. HORNER, Jr.
BY
Williamson, Schroeder, Adams & Meyers
ATTORNEYS

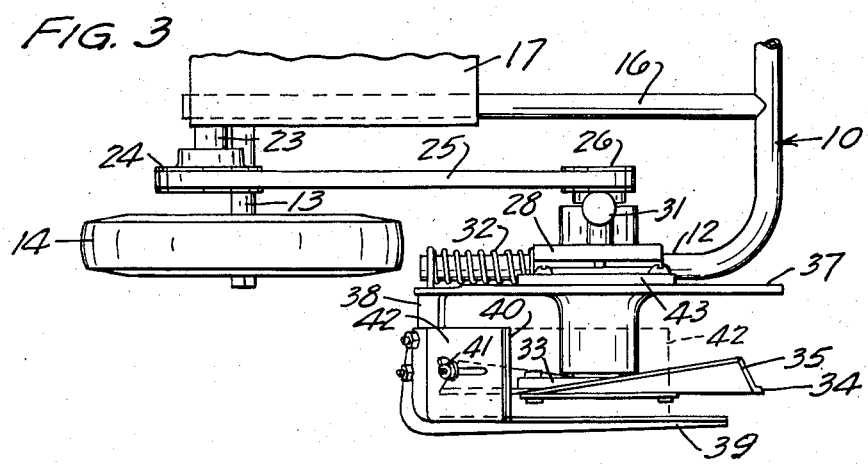
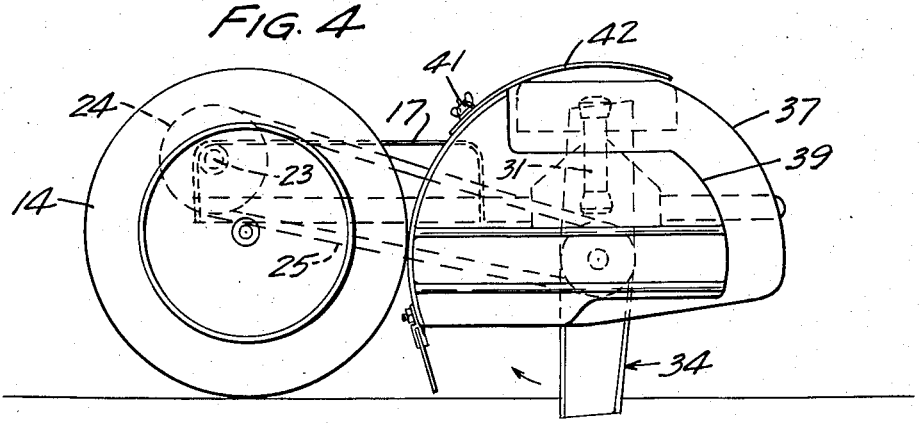
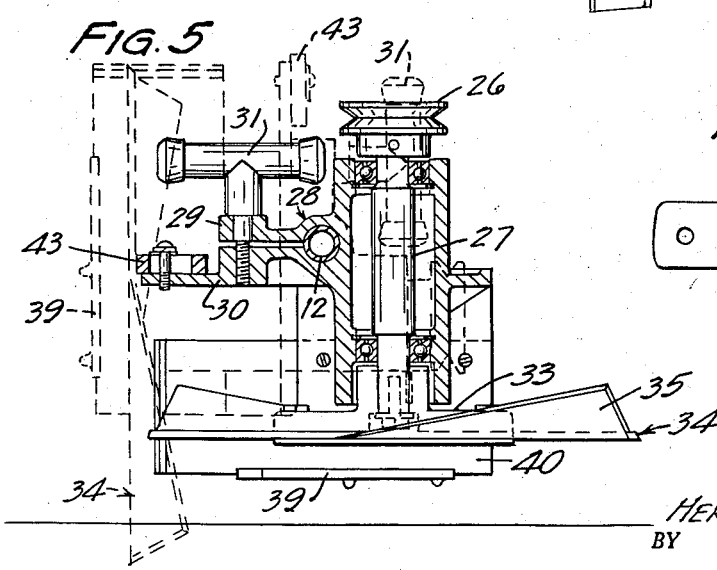
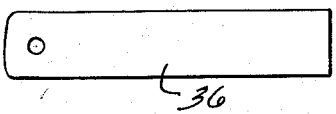

United States Patent Office 2,877,617
Patented Mar. 17, 1959

2,877,617

LAWN TRIMMER AND EDGER

Herbert F. Horner, Jr., Minneapolis, Minn., assignor to Toro Manufacturing Corporation, Minneapolis, Minn., a corporation of Minnesota Application November 16, 1955, Serial No. 547,153

5 Claims. (Cl. 56—25.4)

This invention relates to implements for use in the care and maintenance of a lawn. More particularly, it relates to a combined lawn trimmer and edger.

In the care of lawns, there is need for a device for trimming the grass in relatively inaccessible locations such as corner areas and areas closely adjacent to walls, sidewalks, trees, etc. There is also need for an edging device which will provide a straight lawn edge along sidewalks, retaining walls, etc. Because of the inaccessibility of these areas, the device should preferably be relatively small in size and versatile in function. Some single devices have previously been designed for performing both of these functions so as to eliminate the cost and inconvenience for having a separate power-driven machine for performing each of these functions. However, such devices have had certain undesirable characteristics in that when used as a trimmer, they tend to engage any portion of the lawn which extends upwardly above the general plane of the lawn and cut off portions of the sod growing on such upward extensions. This is commonly known as "scalping." Such devices when used as a trimmer, since their cutter elements must rotate rapidly, also tend to blow the grass ahead of the device into a position where it leans away from the device and thus the grass is not cut sufficiently short, if at all, even though cutter elements of the lifting type with upturned portions to induce upward air currents are utilized. The cutter elements of these devices, since the devices are open to adapt them for edging, often engage a wall or tree or other object around which the trimming operation is being performed, with resultant damage to either the object or to the machine or both. In addition, when used as an edger, such devices have previously been considered necessarily open and hence are relatively dangerous. My invention is directed to overcome these disadvantages.

It is a general object of my invention to provide a novel and improved combined lawn edger and trimmer.

A more specific object is to provide a novel and improved combined lawn edger and trimmer having improved safety features and increased operating efficiency.

Another object is to provide a novel and improved combined lawn edger and trimmer the parts of which are constructed and arranged to increase the lifting efficiency of the cutter elements on the blades of grass and thereby increase the cutting efficiency of the device.

Another object is to provide a novel lawn trimmer the parts of which are constructed and arranged to eliminate the tendency of such devices to blow the grass ahead of the device to a leaning position extending away from the device with resultant inefficient cutting operation.

Another object is to provide a novel combined lawn edger and trimmer the parts of which are constructed and arranged to eliminate scalping by the device when used as a trimmer, without precluding the same from functioning efficiently as an edger or reducing its efficiency as a trimmer.

Another object is to provide a novel combined lawn edger and trimmer constructed and arranged to eliminate or substantially reduce the dangers attendant to its operation when used as an edger.

Another object is to provide a novel combined lawn edger and trimmer constructed and arranged to eliminate engagement of trees, walls and the like by the cutting elements.

These and other objects and advantages of my invention will more fully appear from the following description made in connection with the accompanying drawings, wherein like reference characters refer to the same or similar parts throughout the several views, and in which:

Fig. 3 is a fragmentary plan view of my combined lawn edger and trimmer shown in edging position;

Fig. 4 is a fragmentary side elevational view of my combined lawn edger and trimmer shown in edging position;

Fig. 5 is a fragmentary front elevational with parts broken away and shown in section view of the same embodiment of my invention shown in trimming position; and Fig. 6 is a plan view of a simplified blade which may be utilized in conunction with my invention in performing the edging operation.

Figure 1:
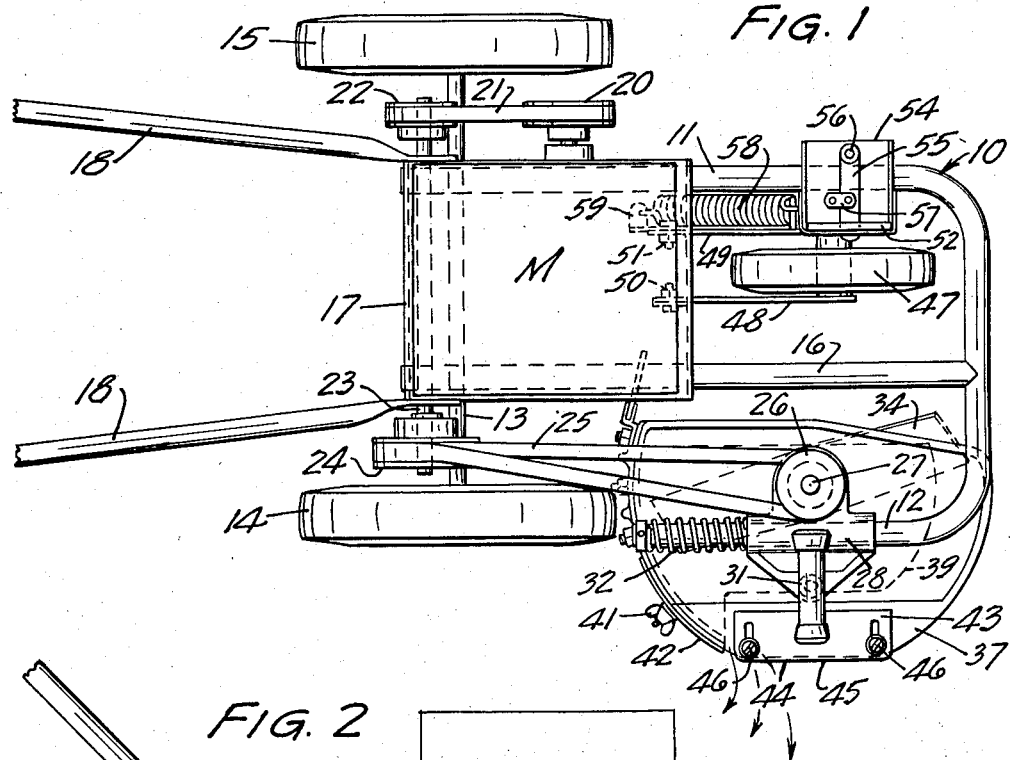
Fig. 1 is a plan view of my combined lawn edger and trimmer shown in trimming position.

One embodiment of my invention, as shown in Figs. 1–6, includes a U-shaped frame 10 having legs 11 and 12. Mounted on the leg 11 is a rear axle 13 which carries rear wheels 14 and 15 to support the frame 10 and adapt it for traversing the ground. A connecting bar 16 extends between the axle 13 and the frame 10. A mounting plate or platform 17 is mounted upon the U-shaped leg 11, the axle 13 and the connecting bar 16 and is adapted to support a removable motor M thereon. Secured to the motor M and extending upwardly and rearwardly from the plate 17 is a pair of handles 18.

The motor M carries a drive pulley 20 which is connected by a belt 21 to a pulley 22 mounted on a countershaft 23, as best shown in Fig. 1. This countershaft is supported by the mounting plate 17 and carries a second pulley 24 at its opposite end which in turn is connected by a drive belt 25 to a driven pulley 26.

Figure 2:
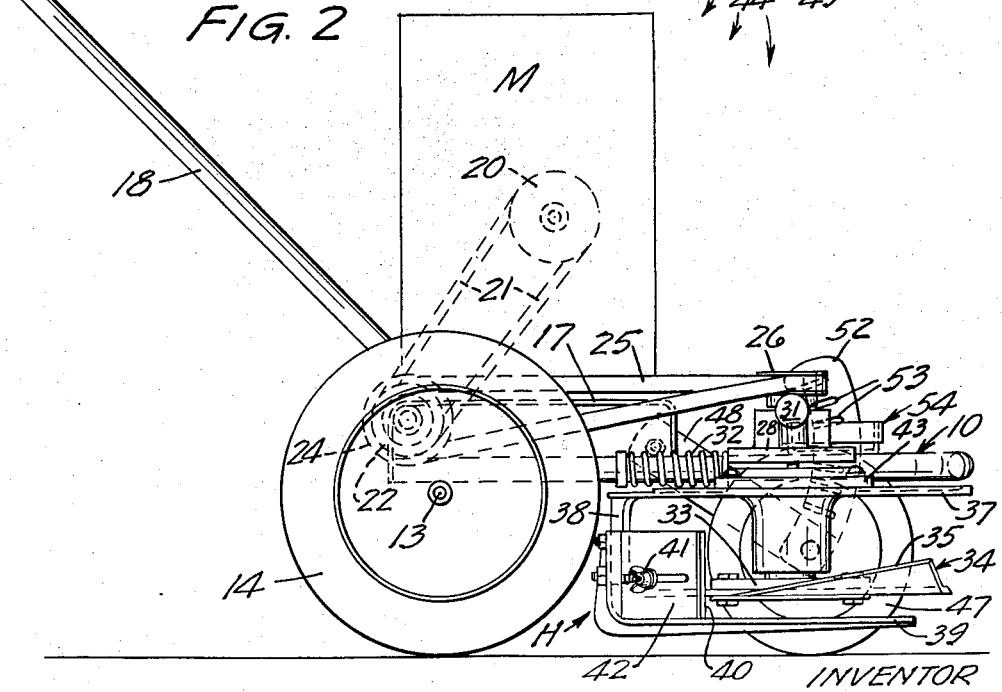
Fig. 2 is a side elevational view of the same in the same position.

The driven pulley 26 is carried by the upper end of a shaft 27 which is mounted for rotation about its longitudinal axis. This shaft 27 is rotatably mounted in a mounting bracket 28 which is of the clamp type and extends around the leg 12 of the U-shaped frame. As best shown in Fig. 5, this mounting bracket has free ends 29 and 30 which are connected by a threaded tightener 31 which passes through each of the free ends and when turned in the proper direction, draws the two ends toward each other and causes the bracket to tightly clamp the leg 12 into fixed relative positions. It will be noted that the bracket 28 may swing around the longitudinal axis of the leg 12 when the tightener 31 is loosened so that the shaft 27 may be swung between vertically extending and horizontally extending positions. The bracket 28 is spring-loaded, as best shown in Figs. 1 and 2, a spring 32 serving to constantly urge the bracket forwardly along leg 12 so that when the threaded tightener 31 is loosened, the belt 25 will always be maintained taut by the spring 32, regardless of the orientation of the shaft 27.

Secured to the lower end of the shaft 27 is a mounting disc 33 to which is secured a blade 34. This blade, as shown, is of the type wherein the trailing edge portions 35 are bent upwardly to cause the blade during its rotation to create strong upwardly directed air currents so as to cause the grass to stand erect and thereby provide a more efficient cutting operation when the leading and cutting edge of the blade engages the grass. Fig. 6 shows a straight blade 36 which may be substituted for the removable blade 34 during the edging operation, if desired.

Secured to the clamping bracket 28 is a housing indicated generally as H. This housing, as best shown in Figs. 1-4, may include a top plate 37 the configuration of which can best be seen in Fig. 1. It will be noted that the top plate does not cover the entire area within the orbit of the blades 34 and that certain peripheral portions of the area are open. Depending from the top plate 37 is an arcuately-shaped flange 38 and mounted on this flange and extending downwardly therefrom and then horizontally below the cutter elements 34 is a combined air current controlling and guard member or plate 39. This plate has a unique shape and serves several purposes. The shape can best be seen by referring to Fig. 4. It will be noted that the major portion of this plate 39 covers the central portion of the area within the orbit of the blades 34 and that most of the peripheral portions of the area covered by the orbit of the blades 34 remains open. In other words, except for the portions which support the plate 39, the peripheral portions of the area within the orbit of the blades 34 are open, while the central portions are covered by the plate 39. The housing also includes an upstanding arcuately-shaped flange 40 which is carried by the plate 39. This flange 40 extends around the blades 34, and together with the top plate 37 and the depending flange 38 forms the housing member for the blade. This flange 40 has an elongated slot formed therein which holds a bolt and wing nut 41 which in turn secures a shiftable section 42 to the upstanding flange 40. This section 42 is shiftable circumferentially of the cutter blades 34 and may be shifted from open to closed positions, as shown in Figs. 1 and 4. This shiftable section is utilized in open position when the machine is used as a trimmer, and is used in closed position when the machine is used as an edger, as will be described more definitely hereinafter. It will be noted that this shiftable section is positioned behind the axis of rotation of the cutter elements 34.

Mounted on the top plate 37 is a guide plate 43. This guide plate has a straight edge portion 44 which is covered with a resilient material such as 45. This plate 43 may be shifted laterally of the housing H by loosening the thumb nuts 46, the slots provided in the guide member permitting the lateral shifting movement. It will be noted that this plate member extends laterally of the housing and the machine and the straight edge portion extends parallel to the direction in which the machine will be moved.

A front wheel 47 is supported by a pair of pivot straps 48 and 49 each of which is pivotally mounted as at 50 and 51 upon the platform 17. Secured to the pivot strap 49 and extending upwardly therefrom is an arcuately-shaped adjustment member 52 which has a plurality of slots 53 formed in one of its sides. This adjustment member 52 passes upwardly through a locking block 54, and a locking plate 55 which swings about its pivoted end as at 56 swings in and out of the slots 53 to effectively lock the adjustment member to the locking block 54 at the desired elevation. A retainer plate 57 serves to hold the locking plate 55 in the desired slot 53. A spring member 58 is connected to the pivot strap 49 and is anchored at its opposite end to a plate 59 which depends from the mounting platform 17. This spring 58 constantly urges the front wheel 47 downwardly so that when the locking plate 55 is swung to unlocking position, the front wheel will automatically be drawn downwardly and the level of the forward part of the machine will be raised.

When the machine is to be used as a trimmer, the shaft 27 is oriented vertically as best shown in Figs. 1 and 2. This is accomplished by loosening the tightener 31 and swinging the mounting block about the leg 12 until the shaft 27 stands vertically. The shiftable section 42 is then shifted to open position, as shown in Fig. 1. When the motor is operated and the blades 34 are rotated thereby, strong circulating currents will be set up within the housing H. However, in maintaining the section 42 in open position, the air comprising these currents is spilled outwardly in the direction of the arrow shown in Fig. 1 before the blades 34 reach a position where the cutting operation actually commences. In other words, the cutting operation of the blades 34 commences at the point where the blade reaches a line extending normal to the direction of movement of the machine and through the axis of the shaft 27, and by opening the housing just prior to the point where the blade 34 reaches the point of the cutting action, the air is permitted to spill out. This precludes the disadvantage generally experienced in such devices wherein such circulating currents, which are formed when a housing is provided, will cause the individual blades to grass to lean forwardly and away from the blades 34 so that an inefficient cutting action will result. This disadvantage is eliminated through the use of this shiftable section of the housing H. On the other hand, when the machine is used as an edger so that the axis of the shaft 27 is disposed horizontally as shown in Figs. 3 and 4, this shiftable section 42 is shifted to closed position as shown in Fig. 4, and it thereupon acts as a guard to prevent dirt and the like from being drawn upwardly into the face of the operator.

The plate 39 serves a triple function. It will be noted that it is disposed slightly above the ground. It serves to prevent scalping by the blades 34 for it engages any upwardly extending portion of the lawn and prevents the blades from coming in contact with it. It also serves to control the upwardly directed air currents generated by the rapid rotation of the blades 34. Reference to Fig. 4 shows that the bottom plate does not cover the peripheral portions of the area within the orbit of the blade 34 but does cover the major portion of the central area within the orbit of the blades. Thus the lifting action provided by the upturned trailing edges of the blades 34 is concentrated at the peripheral portions of the orbit of the blades and is precluded from taking effect at the more central portions. As a result the upwardly directed air currents are even stronger at the peripheral portions of the orbit than they would ordinarily be, and the grass is raised to a more upstanding position as a result thereof. This produces a more efficient cutting action than has heretofore been provided by prior devices. The plate 39 serves a third function in that when the machine is used as an edger, it functions as a guard plate to preclude serious injury to observers or the operator.

It should be noted that the plate member 43 provides a resilient guide element which will enable the operator to follow very closely along a wall or the like without danger of the blade elements 34 engaging the same. The resilient coating 45 on this guide element precludes damage to a tree or the like and at the same time enables the operator to run the machine in extremely close proximity to a structure such as a retaining wall.

Thus it can be seen that I have provided a novel and improved combined lawn edger and trimmer which is considerably safer to utilize and functions in an improved manner. The construction and arrangement of parts of the housing unit is such as to discharge the air sufficiently early so that the adverse effects thereof will not be felt upon the grass directly ahead of the rotating knives. The circulating air currents within the housing are spilled out rearwardly of that point and thus the full lifting effect of the upturned portions of the knives 34 will be felt upon the individual blades of grass with the result that they will stand truly erect and will be cut off at the lowest possible elevation and at a uniform elevation with respect to the other blades of grass, thus giving the lawn a more neat and uniform appearance.

It will, of course, be understood that various changes may be made in the form, details, arrangement and proportions of the various parts without departing from the scope of my invention.

What is claimed is:

1. A combined lawn edging and trimming machine comprising a frame, wheel structure supporting said frame and adapting the same to traverse the ground, a rotary cutter element shiftably mounted on said frame for rotation in both vertical and horizontal planes alternatively, said element being adapted to be connected in driven relation to a source of rotary power and to create upwardly moving air currents when rotating in a horizontal plane, an air-controlling plate member carried by said frame below said cutter element for increasing the lifting effect of the air currents created by said element adjacent the peripheral portions of the orbit of said element, and housing structure supported by said frame and extending downwardly around said cutter element and forming a housing for said element in cooperation with said plate member, said housing structure having a portion thereof in the same plane as said cutter element shiftable relative to the remainder of said housing to a closed position to function as a guard to prevent throwing of dirt by the cutter element when the machine is used as an edger, and being shiftable to open position when the machine is used as a trimmer to permit discharge of the air circulated within the housing by said cutter element rearwardly of the axis of rotation of said cutter element.

2. A combined lawn edging and trimming machine comprising a frame, wheel structure supporting said frame and adapting the same to traverse the ground, a rotary cutter element shiftably mounted on said frame for rotation in both vertical and horizontal planes alternatively, said element being adapted to be connected in driven relation to a source of rotary power and to create upwardly moving air currents when rotating in a horizontal plane, and a housing supported by said frame and extending downwardly around said cutter element, said housing having a section thereof extending downwardly around said cutter element and in the same plane as said cutter element and disposed rearwardly of the axis of rotation of said cutter element and immediately rearwardly of a line normal to the direction of movement of the machine and extending through the axis of rotation of said cutter element, said section being shiftable to an open position when the machine is used as a trimmer to permit the air circulated within the housing by said cutter element to be discharged outwardly of the housing immediately prior to the beginning of the cutting action of the cutter element during each of its rotations, and being shiftable to a closed position when the machine is used as an edger to overhang said cutter element during its rotation and thereby function as a safety guard therefor.

3. A combined lawn edger and trimmer comprising a U-shaped frame having a pair of spaced longitudinally disposed legs, ground-engaging wheel structure supporting said frame and mounted on one leg of the same and adapting the same to traverse the ground, said wheel structure including a single forward wheel positioned between the legs of said U-shaped frame, the legs of said U-shaped frame extending in the direction of movement of the machine, a rotary cutter element mounted on the other of the legs of said U-shaped frame for swinging movement around the longitudinal axis thereof, said cutter element being mounted for rotation in both vertical and horizontal planes alternatively as a result of being swung between different positions around the said other leg of said frame, said cutter element extending into the ground while rotating in a vertical plane with all of said wheel structure engaging the ground, a source of rotary power mounted on said frame and connected in driving relation with said element to cause the same to create upwardly moving air currents when rotating in a horizontal plane, and an air-controlling plate member carried by said frame below said cutter element for increasing the lifting effect of the air currents created by said element adjacent the peripheral portions of the orbit of said element, said plate member being connected with said cutter element and swinging therewith between vertical and horizontal planes.

4. A lawn trimmer comprising a frame, wheel structure supporting said frame and adapting the same to traverse the ground, a rotary blade assembly mounted on said frame for rotation in a horizontal plane, said assembly adapted to be connected in driven relation to a source of rotary power and to carry blades creating upwardly moving air currents when rotating, and a combined guard and air flow control member mounted on said frame and extending below said blade assembly, said combined guard and air flow control member including a generally rectangular plate portion disposed in horizontal position and in spaced relationship below said blade assembly and extending substantially diametrically with relation to the area of rotation of said blade and being of a width substantially less than the diameter of the area swept by the rotating blade so as to continuously underlie only a relatively small central portion of the area swept by the rotating blade directly below the axis of rotation of said blade assembly and having such axis as its geometric center to control the upward flow of air created by the blade assembly.

5. The assembly as defined in claim 4 wherein said combined guard and air flow control member is disposed in spaced relation to the ground.

References Cited in the file of this patent
UNITED STATES PATENTS

| | | |
|---|---|---|
| 2,263,431 | White | Nov. 18, 1941 |
| 2,312,972 | Orr | Mar. 2, 1943 |
| 2,487,224 | Dreischerf | Nov. 8, 1949 |
| 2,680,945 | Reed | June 15, 1954 |
| 2,726,503 | Phelps | Dec. 13, 1955 |
| 2,771,730 | True | Nov. 27, 1956 |